United States Patent
Lee et al.

(10) Patent No.: US 9,670,355 B2
(45) Date of Patent: Jun. 6, 2017

(54) THERMOPLASTIC RESIN COMPOSITION FOR USE AS VEHICLE INTERIOR MATERIAL, AND FORMED PRODUCT FOR USE AS VEHICLE INTERIOR MATERIAL

(71) Applicant: LG Hausys, Ltd., Seoul (KR)

(72) Inventors: Yun-Ho Lee, Ulsan (KR); Yong-Bae Jung, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 31 days.

(21) Appl. No.: 14/441,675

(22) PCT Filed: Jun. 12, 2013

(86) PCT No.: PCT/KR2013/005158
§ 371 (c)(1),
(2) Date: May 8, 2015

(87) PCT Pub. No.: WO2014/073765
PCT Pub. Date: May 15, 2014

(65) Prior Publication Data
US 2015/0284560 A1 Oct. 8, 2015

(30) Foreign Application Priority Data
Nov. 12, 2012 (KR) .................. 10-2012-0127134

(51) Int. Cl.
| C08L 23/06 | (2006.01) |
| C08L 57/00 | (2006.01) |
| C08J 5/18 | (2006.01) |
| C08J 7/04 | (2006.01) |
| C08L 97/02 | (2006.01) |
| C08L 23/08 | (2006.01) |
| C08F 110/02 | (2006.01) |
| C08K 3/26 | (2006.01) |

(52) U.S. Cl.
CPC ............ *C08L 57/00* (2013.01); *C08F 110/02* (2013.01); *C08J 5/18* (2013.01); *C08J 7/04* (2013.01); *C08K 3/26* (2013.01); *C08L 23/06* (2013.01); *C08L 23/08* (2013.01); *C08L 97/02* (2013.01); *C08J 2323/06* (2013.01); *C08K 2003/265* (2013.01); *C08L 2205/02* (2013.01); *C08L 2205/03* (2013.01); *C08L 2205/035* (2013.01); *C08L 2205/08* (2013.01); *C08L 2207/04* (2013.01); *Y10T 428/31938* (2015.04)

(58) Field of Classification Search
CPC ......... C08L 57/00; C08L 97/02; C08L 23/08; C08L 2205/03; C08L 2205/035; C08L 2205/08; C08L 23/06; C08L 2207/04; C08L 2205/02; C08J 5/18; C08J 7/04; C08J 2323/06; Y10T 428/31938; C08F 110/02; C08K 3/26; C08K 2003/265; C08K 2003/0265

See application file for complete search history.

(56) References Cited

U.S. PATENT DOCUMENTS

| 4,477,327 | A | * | 10/1984 | Cassatta | ............. | C08F 299/024 |
| | | | | | | 427/501 |
| 5,308,700 | A | * | 5/1994 | Hikasa | .................... | C08L 23/10 |
| | | | | | | 264/310 |
| 5,602,203 | A | * | 2/1997 | Hamanaka | ............... | C08K 5/00 |
| | | | | | | 525/194 |
| 6,020,046 | A | | 2/2000 | Abhau | | |
| 2008/0249223 | A1 | * | 10/2008 | Yun | ........................ | C08L 23/10 |
| | | | | | | 524/427 |
| 2012/0074027 | A1 | | 3/2012 | Nagpal et al. | | |
| 2013/0096236 | A1 | * | 4/2013 | Bernaerts | .................. | C08L 3/02 |
| | | | | | | 524/9 |

FOREIGN PATENT DOCUMENTS

| CN | 1623765 A | 6/2005 |
| JP | 2009091694 A | 4/2009 |
| KR | 20040063542 A | 7/2004 |
| KR | 20100046502 A | 5/2010 |
| KR | 20110052245 A | 5/2011 |
| KR | 20110116888 A | 10/2011 |
| WO | 2011071156 A1 | 6/2011 |
| WO | WO 2011/117549 * 8/2011 ................ C08L 3/02 |

OTHER PUBLICATIONS

Mitsubishi Motors Corporation et al., Mitsubishi Motors—Develops Vehicle Mat Using Bio Fiber. Retrieved on Feb. 25, 2012.
The TPE 8165n/1002 automotive 8165N/1002 TPE, Guangdong ICP No. 10089450 Hongrun International co. ltd.
Yoo Gi Don, Biochemical Products Reached Stages of Full-Scale Development, 2010, pp. 17-32, LG Business Insight.
International Search Report for PCT/KR2013/005158 mailed on Aug. 23, 2013.
Extended European Search Report dated Jun. 22, 2016 in connection with the counterpart European Patent Application No. 13853203.1-1302.

* cited by examiner

*Primary Examiner* — Alexander Kollias
(74) *Attorney, Agent, or Firm* — Hauptman Ham, LLP

(57) ABSTRACT

Provided is a thermoplastic resin composition for use as a vehicle interior material, including: a biomass-derived resin having biomass-derived polyethylene; and an ASTM D6866 composition having a pMC value of 35 wt %. The thermoplastic resin composition for use as a vehicle interior material uses biomass-derived resin as a replacement for petroleum-based thermoplastic resin in order to reduce the amount of $CO_2$ emissions and have an environmentally friendly effect.

14 Claims, No Drawings

THERMOPLASTIC RESIN COMPOSITION FOR USE AS VEHICLE INTERIOR MATERIAL, AND FORMED PRODUCT FOR USE AS VEHICLE INTERIOR MATERIAL

CROSS REFERENCE TO RELATED APPLICATION

This application claims the priority of Korean Patent Application No. 10-2012-0127134 filed on Nov. 12, 2012 in the Korean Patent and Trademark Office. Further, this application is the National Phase application of International Application No. PCT/KR2013/005158 filed on Jun. 12, 2013, which is incorporated herein by reference in its entirety.

TECHNICAL FIELD

The present invention relates to a thermoplastic resin composition for automotive interior materials and an automotive interior molded article formed therefrom.

BACKGROUND ART

Since a composition including a thermoplastic resin exhibits outstanding moldability, impact resistance and chemical resistance and has great advantages of low specific gravity and low price, the composition is widely used for plastic molded articles and automotive interior/exterior materials. However, there are problems in that such a composition causes environmental pollution in manufacture of sheets and articles, and that the composition has great difficulty in disposal due to difficulty in recycling thereof and thus is not environmentally friendly.

Therefore, studies into manufacturing environmentally friendly molded articles to replace environmentally unfriendly synthetic resin sheets and composite sheets are being actively conducted in recent years.

DISCLOSURE

Technical Problem

It is one aspect of the present invention to provide a thermoplastic resin composition for automotive interior materials including a biomass-derived resin replacing petroleum-based thermoplastic resins.

It is another aspect of the present invention to provide an automotive interior molded article manufactured from the thermoplastic resin composition for automotive interior materials.

Technical Solution

In accordance with one aspect of the present invention, a thermoplastic resin composition for automotive interior materials includes a biomass-derived resin including biomass-derived polyethylene and has a pMC value of 15 wt % to 35 wt %, as measured in accordance with ASTM D6866.

The composition may further include one additional biomass-derived resin selected from the group consisting of polypropylene, a thermoplastic polyolefin composite resin (commonly referred to as TPO), polylactic acid (PLA), cellulose, chitin, starch, thermoplastic starch (TPS), polyhydroxyalkanoates (PHAs), polyvinyl alcohol, polyglycolic acid (PGA), polyethylene terephthalate (PET), polybutylene succinate (PBS), polybutylene terephthalate (PBT), polybutylene adipate terephthalate (PBAT), polybutylene adipate-co-butylene succinate (PBAS), polybutylene adipate-co-butylene succinate terephthalate (PBAST), polytrimethylene terephthalate (PTT), polycaprolactone (PCL), polyamide (PA), polyurethane (PU), poly(ester-amide), poly(ester-urethane), and combinations thereof.

The composition may further include a biomass-derived resin selected from the group consisting of polyhydroxyalkanoates (PHAs), polylactic acid (PLA), cellulose, and combinations thereof.

The composition may further include a partially crosslinked thermoplastic polyolefin (TPO) composite resin as a non-biomass-derived resin.

The partially crosslinked TPO composite resin may include a composite resin type olefin thermoplastic elastomer formed by dispersing rubbery particles in a thermoplastic polyolefin matrix resin, the rubbery particles being partially crosslinked.

In one embodiment, the composition may include 10% by weight (wt %) to 50 wt % of the biomass-derived polyethylene, 0 wt % to 15 wt % of the additional biomass-derived resin, 0 wt % to 15 wt % of a compatibilizer, 0 wt % to 15 wt % of a non-crosslinked TPO composite resin, 30 wt % to 50 wt % of the partially crosslinked TPO composite resin, 0 wt % to 10 wt % of a completely crosslinked TPO composite resin, 0 wt % to 10 wt % of ethylene octene rubber (EOR), and 0 wt % to 15 wt % of polypropylene.

The compatibilizer may include a polar group-modified polyethylene resin.

The non-crosslinked TPO composite resin may have a Shore A hardness of 87 to 92, a melt flow index (MI) of 0.6 g/10 min to 0.8 g/10 min (230° C./2.16 kg), a specific gravity of 0.88 to 0.90, and an elongation of 600% to 700%.

The partially-crosslinked TPO composite resin may have a Shore A hardness of 63 to 66, a melt flow index (MI) of 0.6 g/10 min to 1.2 g/10 min (230° C./5 kg), and a specific gravity of 0.88 to 0.90.

The completely-crosslinked TPO composite resin may have a Shore A hardness of 64 to 69, a melt flow index (MI) of 20 g/10 min to 25 g/10 min (230° C./10 kg), and a specific gravity of 0.88 to 0.90.

Each of the biomass-derived polyethylene and the additional biomass-derived resin may be prepared from biofuels processed or extracted from one biomass material selected from the group consisting of corn, Jerusalem artichokes, sugar cane, sugar beets, and combinations thereof.

The thermoplastic resin composition for automotive interior materials may further include one additive selected from the group consisting of plasticizers, inorganic fillers, photostabilizers, heat stabilizers, antioxidants, lubricants, flame retardants, antimicrobials, anti-hydrolysis agents, and combinations thereof.

In accordance with another aspect of the present invention, an automotive interior molded article includes a sheet manufactured from the thermoplastic resin composition for automotive interior materials as set forth above.

The automotive interior molded article may further include a surface-treated layer.

The surface-treated layer may be formed using an EB curable water-based treatment agent or an EB curable solvent-free treatment agent.

Advantageous Effects

According to embodiments of the present invention, the thermoplastic resin composition for automotive interior materials uses the biomass-derived resin replacing petroleum-based thermoplastic resins and thus can reduce $CO_2$ generation, and the automotive interior molded article is subjected to water-based or solvent-free treatment and thus can reduce volatile organic compounds (VOCs).

BEST MODE

Hereinafter, embodiments of the present invention will be described in detail. However, it should be understood that the present invention is not limited to the following embodiments. The scope of the invention should be defined only by the accompanying claims and equivalents thereof.

In accordance with one aspect of the present invention, a thermoplastic resin composition for automotive interior materials includes biomass-derived polyethylene and has a pMC value of 15 wt % to 35 wt %, as measured in accordance with ASTM D6866.

The thermoplastic resin composition for automotive interior materials includes the biomass-derived polyethylene as a biomass-derived resin, and may optionally further include another additional biomass-derived resin. In addition, the resin composition may be a mixture of the biomass-derived resin and a non-biomass-derived thermoplastic resin, for example, a petroleum-based thermoplastic resin. The amount of the biomass-extracted components in the thermoplastic resin composition for automotive interior materials can be evaluated as to pMC (percent modern carbon) value in accordance with ASTM D6866.

The pMC value can be measured or calculated by carbon dating, since an amount of carbon isotope $^{14}C$ is different between a bio-raw material and a petroleum raw material.

The pMC value of the thermoplastic resin composition for automotive interior materials may be adjusted depending upon the amount of the biomass-derived resin including the biomass-derived polyethylene as well as the kinds of biomass-derived resins to be used for each of the biomass-derived polyethylene and the additional biomass-derived resin.

The thermoplastic resin composition for automotive interior materials includes the biomass-extracted components adjusted in amount such that the resin composition has a pMC value of about 15 wt % to about 35 wt %. Within this range, the thermoplastic resin composition can realize suitable properties for automotive interior materials while exhibiting environmental friendliness.

When the thermoplastic resin composition includes, in addition to the biomass-derived polyethylene, another additional biomass-derived resin, the additional biomass-derived resin may include, for example, polypropylene, a thermoplastic polyolefin composite resin (commonly referred to as TPO and hereinafter will be referred to as "TPO composite resin"), polylactic acid (PLA), cellulose, chitin, starch, thermoplastic starch (TPS), polyhydroxyalkanoates (PHAs), polyvinyl alcohol, polyglycolic acid (PGA), polyethylene terephthalate (PET), polybutylene succinate (PBS), polybutylene terephthalate (PBT), polybutylene adipate terephthalate (PBAT), polybutylene adipate-co-butylene succinate (PBAS), polybutylene adipate-co-butylene succinate terephthalate (PBAST), polytrimethylene terephthalate (PTT), polycaprolactone (PCL), polyamide (PA), polyurethane (PU), poly(ester-amide), poly(ester-urethane), and combinations thereof.

The biomass-derived polyethylene and the additional biomass-derived resin refer to resins prepared using biomass as a raw material. For example, biofuels, such as methanol, ethanol, biodiesel fuels and the like, can be obtained through processing or extraction from biomass as biological resources including cereals, such as corn, Jerusalem artichokes, sugar cane, sugar beet, combinations thereof and the like, plants, and the like. The biomass-derived resin including the biomass-derived polyethylene is prepared from the biofuels.

In some examples, biomass-derived polyethylene may be obtained by extracting sugars directly from sugar cane and sugar beet, followed by alcohol fermentation. Unlike petroleum-based polyethylene generating carbon dioxide in preparation thereof, the biomass-derived polyethylene resin is produced from bioethanol obtained using sugar cane as a raw material, and there are advantages in that the biomass-derived polyethylene resin is renewable and can significantly reduce generation of carbon dioxide and, rather, allows carbon dioxide in air to be used in preparation thereof.

The biomass-derived resin is an alternative resource capable of replacing chemical fuels generating carbon dioxide, and is an environmentally friendly resin having advantages such as reduction in $CO_2$, and the like, as compared with petroleum-based resins such as typical polyethylene resins, polypropylene resins, and the like.

In addition, the thermoplastic resin composition for automotive interior materials including the biomass-derived resin is also environmentally friendly in that the content of vegetable raw materials and vegetable additives having good compatibility with the biomass-derived polyethylene or the additional biomass-derived resin can be increased in preparation of the composition, such as polymerization of the composition, and the like, and in that the biomass-derived polyethylene and the additional biomass-derived resin can be recycled as a thermoplastic resin.

The biomass-derived polyethylene and the additional biomass-derived resin include resins extracted directly from bio-raw materials as well as resins prepared by polymerization or copolymerization of the bio-raw material with a non-biomass-derived monomer or prepared using materials extracted from the bio-raw materials as a raw material.

As such, even though the composition includes the same amount of the biomass-derived polyethylene or the additional biomass-derived resin, the composition includes different amounts of biomass-extracted components when the biomass-derived polyethylene and the additional biomass-derived resin are materials purely extracted from the aforementioned bio-raw materials and when the biomass-derived polyethylene and the additional biomass-derived resin are obtained by reacting a material, which is used as a raw material and extracted from the bio-raw materials, with another compound. Accordingly, the pMC value of the composition in accordance with ASTM D6866 may vary.

As described above, the additional biomass-derived resin may be a resin, such as PLA and PHA, which is obtained by direct extraction from biomass, and may be a resin, such as: PBS, PBT, PBAS, PBAT and PBAST prepared from biomass-derived 1,4-butanediol as a raw material; PET prepared from biomass-derived ethylene glycol; PTT prepared from biomass-derived 1,3-propanediol; and TPS prepared from biomass-derived starch, glucose or lactose, which is prepared by mixing a biomass-derived raw material with another material.

In one embodiment, the thermoplastic resin composition for automotive interior materials includes the biomass-derived polyethylene; and the one additional biomass-derived resin selected from the group consisting of polyhydroxyalkanoates (PHAs), polylactic acid (PLA), cellulose, and combinations thereof.

As described above, the thermoplastic resin composition for automotive interior materials may further include the non-biomass-derived thermoplastic resin, for example, a petroleum-based resin. In another embodiment, the thermoplastic resin composition for automotive interior materials includes: the biomass-derived polyethylene; the one additional biomass-derived resin selected from the group consisting of polyhydroxyalkanoates (PHAs), polylactic acid (PLA), cellulose, and combinations thereof; and a partially crosslinked TPO composite resin as the non-biomass-derived thermoplastic resin.

The thermoplastic resin composition for automotive interior materials is an environmentally friendly composition including a predetermined amount of the biomass-derived resin including the biomass-derived polyethylene instead of the non-biomass-derived thermoplastic resin so as to have a pMC value of 15 wt % to 35 wt % as measured in accordance with ASTM D6866. Further, the thermoplastic resin composition may realize desired properties by blending with the non-biomass-derived resin such as a petroleum-based resin.

The thermoplastic resin composition for automotive interior materials can suffer from deterioration in properties having a trade-off relationship, depending upon the kind of the biomass-derived resin. To solve this problem, the thermoplastic resin composition may be blended with a non-biomass-derived resin capable of supplementing such deterioration in properties.

In one embodiment, the thermoplastic resin composition for automotive interior materials includes: the biomass-derived polyethylene; the one additional biomass-derived resin selected from the group consisting of polyhydroxyalkanoates (PHAs), polylactic acid (PLA), cellulose, and combinations thereof; a compatibilizer; a non-crosslinked TPO composite resin; the partially crosslinked TPO composite resin; a completely crosslinked TPO composite resin; ethylene octene rubber (EOR); and polypropylene. The composition can have a pMC value of 15 wt % to 35 wt % as measured in accordance with ASTM D6866 and realize properties required for automotive interior materials, i.e. durability, heat resistance, light resistance, chemical resistance, drug resistance, workability, and the like.

In one embodiment, the thermoplastic resin composition for automotive interior materials may include 1 wt % to 50 wt % of the biomass-derived polyethylene, 0 wt % to 15 wt % of the additional biomass-derived resin, 0 wt % to 15 wt % of the compatibilizer, 0 wt % to 15 wt % of the non-crosslinked TPO composite resin, 30 wt % to 50 wt % of the partially crosslinked TPO composite resin, 0 wt % to 10 wt % of the completely crosslinked TPO composite resin, 0 wt % to 10 wt % of the ethylene octene rubber (EOR), and 0 wt % to 15 wt % of the polypropylene.

The TPO composite resin may be any TPO resin generally known in the art without limitation. Specifically, the TPO composite resin may include a composite resin formed by dispersing rubbery particles in a thermoplastic polyolefin matrix resin, and may be classified into completely crosslinked, partially crosslinked, and non-crosslinked TPO composite resins according to crosslinking degree of the rubbery particles. Here, as a crosslinking agent, a phenol crosslinking agent or a peroxide crosslinking agent may be used. The TPO composite resin may further include inorganic fillers such as talc, calcium carbonate, and the like.

The TPO composite resin can improve melt strength required of the thermoplastic resin composition for automotive interior materials when the composition is subjected to calendering. In addition, to allow the composition to secure appropriate sagging upon vacuum molding, a completely crosslinked TPO resin and a partially-crosslinked TPO resin may be separately used depending upon degree of crosslinking. Since the partially-crosslinked TPO resin can form a structure in which a polyolefin chain is present between partially-crosslinked rubbers, the partially-crosslinked TPO resin is uniformly stretched upon stretching and thus can allow a molded article to have a reduced thickness deviation. The completely crosslinked TPO resin may be used to prevent a problem caused by overly high elongation of a bio-resin composition, or to prevent deterioration in trimmability of the molded article.

Specifically, the non-crosslinked TPO composite resin may have a Shore A hardness of about 87 to about 92, a melt flow index (MI) of about 0.6 g/10 min to about 0.8 g/10 min (230° C./2.16 kg), a specific gravity of about 0.88 to about 0.90, and an elongation of about 600% to about 700%. The non-crosslinked TPO composite resin may be present in an amount of about 15 wt % or less, specifically about 5 wt % to about 10 wt %, based on 100 wt % of the composition.

The partially-crosslinked TPO composite resin may have a Shore A hardness of about 63 to about 66, a melt flow index (MI) of about 0.6 g/10 min to about 1.2 g/10 min (230° C./5 kg), and a specific gravity of about 0.88 to about 0.90. The partially-crosslinked TPO composite resin may be present in an amount of about 30 wt % to about 50 wt % based on 100 wt % of the composition.

The completely-crosslinked TPO composite resin may have a Shore A hardness of about 64 to about 69, a melt flow index (MI) of about 20 g/10 min to about 25 g/10 min (230° C./10 kg), and a specific gravity of about 0.88 to about 0.90. The completely-crosslinked TPO composite resin may be present in an amount of about 10 wt % or less, specifically about 3 wt % to about 5 wt %, based on 100 wt % of the composition.

When the thermoplastic resin composition for automotive interior materials includes the additional biomass resin in combination with the biomass-derived polyethylene, a compatibilizer may be used to increase compatibility. For example, the compatibilizer may be a functional group-containing TPO composite resin. Alternatively, the compatibilizer may be a polar group-modified polyethylene resin. The compatibilizer may be present in an amount of about 15 wt % or less, specifically about 5 wt % to about 10 wt %, based on 100 wt % of the composition. Within this range, the compatibilizer can increase miscibility between the biomass-derived polyethylene and the additional biomass resin while preventing unnecessary deterioration in properties.

The biomass-derived polyethylene may be present in an amount of about 1 wt % to about 50 wt %, specifically about 10 wt % to about 40 wt %, based on 100 wt % of the composition.

A grade of ethylene-octene rubber is divided based on ethylene content and mainly used to enhance soft texture of a molded article. Ethylene-octene rubbers are not crosslinked by crosslinking agents and thus have no odor while exhibiting excellent properties in terms of light resistance and heat resistance. Specifically, the ethylene-octene rubber may have a melt flow index (MI) of about 0.4 g/10 min to about 0.6 g/10 min (190° C./2.16 kg), a specific gravity of about 0.86 to about 0.88, and a Shore A hardness of about 60 to about 70. The ethylene-octene rubber may be present in an amount of about 10 wt % or less, specifically about 3 wt % to about 5 wt %, based on 100 wt % of the composition.

Although the ethylene-octene rubber (EOR) has low melt strength, since the EOR is included in conjunction with the inorganic fillers and thus impregnated into the inorganic fillers, the composition can exhibit similar melt strength to that of the TPO composite resin and have an effect of odor improvement.

A grade of EOR is also divided based on octene content, and a high octene content causes deterioration in hardness of the EOR, thereby causing deterioration in calendering processability despite improvement in softness. Thus, the octene content may be adjusted according to the purpose thereof.

The polypropylene resin may be used to improve shape maintenance of a molded article after the thermoplastic resin composition for automotive interior materials is subjected to calendaring. The polypropylene resin may be present in an amount of about 15 wt % or less, specifically about 5 wt % to about 10 wt %, based on 100 wt % of the composition. Within this range, the composition can exhibit improved moldability upon processing of the molded article to prevent rupturing upon vacuum molding, to improve texture of the article by realizing appropriate strength of the molded article, and to improve appearance of the article.

Properties of the thermoplastic resin composition for automotive interior materials may be adjusted through addition of additives commonly known in the art. For example, the composition may further include one additive selected from the group consisting of plasticizers, inorganic fillers, photo-stabilizers, heat stabilizers, antioxidants, lubricants, flame retardants, antimicrobials, anti-hydrolysis agents, and combinations thereof. For example, the additive may be present in an amount of 10 wt % or less, specifically, about 3 wt % to about 8 wt %, based on 100 wt % of the thermoplastic resin composition for automotive interior materials.

For example, the inorganic fillers may be used to improve mechanical properties of the molded article formed from the thermoplastic resin composition for automotive interior materials, and may include at least one selected from among calcium carbonate, calcium oxide, mica, talc, and the like.

In accordance with another aspect of the present invention, an automotive interior molded article includes a sheet manufactured from the above thermoplastic resin composition for automotive interior materials. As described above, since the automotive interior molded article is manufactured using a biomass-derived resin including biomass-derived polyethylene and thus uses less resins prepared from petroleum-based raw materials, the automotive interior molded article can realize an environmentally friendly effect of reducing $CO_2$.

The automotive interior molded article may further include a surface-treated layer. The surface-treated layer may be formed of a surface treatment agent. The surface treatment agent may include oil-based, water-based, solvent-free treatment agents and the like depending upon types of solvents, and may include thermally curable, UV curable, EB curable treatment agents, and the like depending upon curing methods. The surface-treated layer may be formed by any method known in the art. However, since the oil-based treatment agent can cause a problem of increase in emission of total volatile organic compounds (TVOCs) and formaldehyde, the automotive interior molded article can be made more environmentally friendly by forming the surface-treated layer using a treatment agent which is a water-based or solvent-free treatment agent and is cured by electron beam (EB) irradiation.

The automotive interior molded article may be formed by any method known in the art. The automotive interior molded article may be manufactured by a method for molding a thermoplastic resin composition known in the art using the thermoplastic resin composition for automotive interior materials as set forth above.

For example, a mixture prepared by mixing resin components of the thermoplastic resin composition for automotive interior materials is melted and subjected to calendering via calender rolls, thereby manufacturing the automotive interior molded article.

The mixture may be melted by a typical method using single-screw extruders, twin-screw extruders, kneaders, Banbury mixers, and the like. Calendering may be performed using a typical method known in the art.

Specifically, the mixture may be melted at about 160° C. to about 230° C. The molten mixture may be subjected to calendering via the calender rolls having a surface temperature from about 130° C. to about 180° C.

When the automotive interior molded article further includes the surface-treated layer, the surface treatment agent is coated onto a surface of the sheet manufactured from the thermoplastic resin composition for automotive interior materials, followed by surface treatment, for example, by irradiation with electron beams, thereby forming the surface-treated layer. When the surface-treated layer is formed by electron beam irradiation, since the surface treatment agent is polymerized and solidified due to generation of radicals by electron beam irradiation, there is no need for polymerization initiators and the like, unlike thermal curing and UV curing, and there is almost no concern of change in quality. In addition, since EB curing provides high energy utilization efficiency and fast curing rate as compared with thermal curing and UV curing, improvement in productivity can be expected.

The surface treatment agent may be an oil-based or water-based treatment agent, and the surface treatment agent, which can be cured by electron beam irradiation, may include melamine resins, epoxy resins, rubber-based resins, acrylic resins, ester resins, urethane resins, and mixtures thereof.

For example, when surface treatment is performed using an acrylic polymer, the plasticizer is prevented from transition and the article has improved surface strength, whereby the automotive interior molded article can exhibit excellent durability.

Since the surface-treated layer subjected to surface treatment by electron beam irradiation improves elongation of the automotive interior molded article, the automotive interior molded article does not suffer from breakage and deterioration in light resistance and heat resistance even after molding of the thermoplastic resin composition for automotive interior materials. In addition, unlike UV curing and thermal curing using benzene, toluene or the like as a solvent, since electron beam curing does not use a solvent causing emission of environmentally harmful elements such as VOCs and the like, surface treatment by electron beam irradiation can improve environmental friendliness of the automotive interior molded article by inclusion of the biomass-derived resin.

Since the automotive interior molded article includes the environmentally friendly biomass-derived resin while exhibiting excellent properties in terms of solvent resistance, abrasion resistance, scratch resistance, light resistance, chemical resistance and the like, the automotive interior molded article does not cause odor in automobiles, and can be used as a cover material of automotive interior parts and thus can improve an indoor mood of the automobiles.

Hereinafter, the present invention will be described in more detail with reference to some examples. It should be understood that these examples are provided for illustration only and are not to be construed in any way as limiting the present invention.

EXAMPLES

Examples 1 to 4 and Comparative Examples 1 to 2

In Examples 1 to 4 and Comparative Examples 1 to 2, compositions were prepared according to components and amounts as listed in Table 1 using the following compounds. Each of the compositions used in Examples 1 to 4 and Comparative Examples 1 to 2 was measured as to pMC value in accordance with ASTM D6866. Measurement results are shown in Table 1.

Each of the mixed compositions was melted and subjected to calendering, wherein the molten mixture was passed through a gap between calender rolls for compression, thereby manufacturing a sheet.

An EB curable water-based treatment agent as a surface treatment agent was coated onto a surface of each of the manufactured sheets using a sprayer, followed by forming a surface-treated layer by curing the surface treatment agent using an electron-beam crosslinking apparatus, thereby preparing a specimen of an automotive interior molded article.

Compounds Used in Examples and Comparative Examples

Completely crosslinked TPO resin: N65EH, Hwaseung R&A Co., Ltd.
Partially crosslinked TPO resin: 8165N, Hyundai EP Co., Ltd.
Non-crosslinked TPO resin: Q100F, Baselle Co., Ltd.
Ethylene-octene rubber: Engage8180, DOW Co., Ltd.
Polypropylene resin: B330F, SK Energy Co., Ltd.
Polyethylene resin: SF 316, Lotte Chemical Co., Ltd.
Biomass-derived polyethylene (PE) prepared: Melt flow index (MI): 1.0 (190° C./2.16 kg), Specific gravity: 0.92, Tensile strength: 40 MPa, Elongation: 1400%
Compatibilizer: WD203, SUMITOMO Co., Ltd.
Polylactic acid (PLA): 2002D, NatureWorks Co., Ltd.
Polyhydroxyalkanoate (PHA): EM10051, Ecoman Co., Ltd.
Cellulose: CA-398-6, EASTMAN Co., Ltd.
Inorganic filler: Calcium carbonate Experimental Example 1: Hardness Hardness was measured in accordance with ASTM D2240. Results are shown in Table 3.

Experimental Example 2: Tensile Strength and Elongation at Break

A maximum load for a certain area and elongation at break were measured at a test speed of 200 mm/min and at a gauge length of 70 mm using a Type 1 specimen and a tensile tester in accordance with ASTM D 638.

Experimental Example 3: Heat Aging Resistance

A specimen was kept in a forced convection oven at a temperature of 110±2° C. for 300 hours, followed by determination of ΔEcmc at an angle of 45° and color change with the naked eye based on the gray scale according to ISO 105-A02 using a spectrophotometer, thereby evaluating a grade.

Experimental Example 4: Light Aging Resistance

A specimen was subjected to light irradiation at an intensity of 126 mJ/m$^2$ at a black panel temperature of 89±3° C. and a humidity of 50±5% RH using a tester in accordance with ISO 105, followed by determination of color change with the naked eye based on the gray scale according to ISO 105-A02, thereby evaluating a grade.

Experimental Example 5: Chemical Resistance

A surface of a specimen was rubbed back and forth 10 times with a piece of gauze sufficiently wetted in the test liquids listed in Table 2, and left at room temperature for 1 hour. Next, color change was determined with the naked eye based on the gray scale according to ISO 105-A02, thereby evaluating a grade.

TABLE 1

| Component | | Example (wt %) | | | | Comparative Example (wt %) | |
|---|---|---|---|---|---|---|---|
| | | 1 | 2 | 3 | 4 | 1 | 2 |
| Biomass-derived resin | PE | 37 | 21 | 18 | 13 | — | — |
| | PHA | — | — | — | 9 | — | — |
| | PLA | — | 11 | — | — | 26 | — |
| | DAC | — | — | 7 | — | — | — |
| Completely crosslinked TPO | | 3 | 4 | 2 | 6 | — | 7 |
| Partially crosslinked TPO | | 36 | 39 | 43 | 43 | 21 | 42 |
| Non-crosslinked TPO | | 7 | — | 5 | 3 | 18 | 4 |
| Ethylene-octene rubber (EOR) | | 8 | 5 | 3 | 7 | 6 | 6 |
| Polypropylene | | 5 | 3 | 10 | 7 | — | 23 |
| Polyethylene | | — | — | — | — | — | 11 |
| Compatibilizer | | — | 11 | 7 | 9 | 26 | — |
| Inorganic filler | | 4 | 6 | 5 | 3 | 3 | 7 |
| pMC | | 34 wt % | 29 wt % | 23 wt % | 18 wt % | 25 wt % | 0 wt % |

TABLE 2

| Test liquid | Remarks |
|---|---|
| Glass cleaner | Alkalescent glass cleaner |
| Cleaner | Mixed liquid of 95% distilled water and 5% neutral detergent |
| Washer liquid | Mixed liquid of 50% isopropyl alcohol and 50% distilled water |
| Gasoline | Unleaded gasoline |
| Polishing wax | M5 (Hyundai Mobis Co., Ltd.) |

Experimental Example 6: Sunscreen Resistance

In accordance with GMN 10033, two sheets of white cotton cloth having the same size were placed on an aluminum plate (50 mm×50 mm), and 0.25 g of a sunscreen (Coppertone Waterbabies SPF 45) was coated onto a front surface thereof. Next, the coated aluminum plate was placed on a test specimen and brought into close contact therewith by applying a load of 500 g to the aluminum plate, followed by leaving in a thermostat at 80±2° C. for about 1 hour. Next, the white cotton cloth and the aluminum plate were removed from the specimen, which in turn was left at room temperature for about 10 to 15 minutes. Then, the test specimen was washed with a neutral detergent, dried, and determined as to color change with the naked eye. The test specimen was rated as Excellent when suffering from almost no color change; the test specimen was rated as Good when suffering from insignificant color change; the test specimen was rated as Normal when exhibiting no abnormality in quality although suffering from color change; and the test specimen was rated as Poor when suffering from severe color change.

Experimental Example 7: Odor

A 4 L glass container was heated to 100° C. for about 1 hour and left at room temperature for 1 hour to release volatile compounds from the glass container. Next, the specimen was cut to a size of 50 mm×60 mm, heated to 100° C. in the glass container for 2 hours, and then removed from the glass container. Next, the specimen was left at room temperature (23±2° C.) for 60 minutes for cooling, followed by opening a lid of the glass container by about 3 cm to about 4 cm, thereby evaluating an odor of the specimen. The odor was scored as follows: a severe odor was given 1 point; a normal odor was given 3 points; and almost no odor was given 5 points.

Experimental Example 8: Calendering Processability

A sheet of each blend was produced using a calendering machine in which a bio-molding composition was melted and compressed between rolls and then processed into a sheet form. Then, the sheet was observed with the naked eye to determine workability and surface state. The sheet was determined as Poor when un-melted resins remained on the surface thereof or the sheet had a non-uniform surface due to deterioration in flowability.

Results of properties measured on each of the specimens of the automotive interior molded articles manufactured in Examples 1 to 4 and Comparative Examples 1 to 2 are shown in Table 3.

TABLE 3

| Properties | Example | | | | Comparative Example | |
|---|---|---|---|---|---|---|
| | 1 | 2 | 3 | 4 | 1 | 2 |
| Hardness [Shore A] | 80 | 78 | 77 | 81 | 80 | 82 |
| Specific gravity | 0.92 | 0.91 | 0.92 | 0.93 | 0.91 | 0.92 |
| Tensile strength (kgf/cm$^2$) | 142 | 139 | 133 | 137 | 81 | 129 |
| Elongation at break (%) | 608 | 571 | 586 | 591 | 226 | 563 |
| Heat aging resistance (gray scale) | 4 | 4 | 4 | 4 | 1 | 4 |
| Light aging resistance (gray scale) | 4 | 4 | 4 | 4 | 1 | 4 |
| Chemical resistance (gray scale) | 4 | 4 | 4 | 4 | 3 | 4 |
| Sunscreen resistance | Good | Good | Good | Good | Poor | Good |
| Odor (grade) | 4 | 4 | 4 | 4 | 3 | 4 |
| Calendering processability | Good | Good | Good | Good | Poor | Good |

It could be confirmed from the results that the specimens of the automotive interior molded articles manufactured in Examples 1 to 4 provided excellent properties equal to the specimen prepared using the petroleum-based resins, i.e. the specimen of Comparative Example 2 prepared using olefin resins including polypropylene and polyethylene without using the biomass-derived resins, while securing environmental friendliness due to use of the biomass-derived resins. In Examples 1 to 4, there is significance in that the specimens of Examples 1 to 4 realized environmental friendliness while exhibiting comparable properties to those of Comparative Example 2 using no biomass-derived resins.

On the other hand, the specimen of Comparative Example 1 where PLA was used alone to have a pMC value of 25 wt % without using the biomass-derived polyethylene exhibited poor properties.

The invention claimed is:
1. A thermoplastic resin composition for automotive interior materials, comprising
   10 wt % to 50 wt % of a biomass-derived polyethylene;
   7 wt % to 9 wt % of an additional biomass-derived resin;
   3 wt % to 15 wt % of non-crosslinked thermoplastic polyolefin composite resin;
   30 wt % to 50 wt % of partially crosslinked thermoplastic polyolefin composite resin;
   2 wt % to 10 wt % of completely crosslinked thermoplastic polyolefin composite resin;
   3 wt % to 10 wt % of ethylene octene rubber; and
   5 wt % to 10 wt % of a compatibilizer,
   wherein the additional biomass-derived resin comprises polyhydroxyalkanoates or cellulose,
   the compatibilizer comprises a polar group-modified polyethylene resin, and the thermoplastic resin composition having a percent modern carbon value of 18 wt % to 23 wt %, as measured in accordance with ASTM D6866.

2. The thermoplastic resin composition according to claim 1, the additional biomass-derived resin further comprises one selected from the group consisting of polypropylene, a thermoplastic polyolefin composite resin, polylactic acid, chitin, starch, thermoplastic starch, polyvinyl alcohol, polyglycolic acid, polyethylene terephthalate, polybutylene succinate, polybutylene terephthalate, polybutylene adipate terephthalate, polybutylene adipate-co-butylene succinate, polybutylene adipate-co-butylene succinate terephthalate, polytrimethylene terephthalate, polycaprolactone, polyamide, polyurethane, poly(ester-amide), poly(ester-urethane), and combinations thereof.

3. The thermoplastic resin composition according to claim 1, further comprising: one additional biomass-derived resin selected from the group consisting of polyhydroxyalkanoates, polylactic acid, cellulose, and combinations thereof.

4. The thermoplastic resin composition according to claim 1, wherein the partially crosslinked thermoplastic polyolefin composite resin comprises a composite resin olefin thermoplastic elastomer formed by dispersing rubbery particles in a thermoplastic polyolefin matrix resin, the rubbery particles being partially crosslinked.

5. The thermoplastic resin composition according to claim 1, further comprising:
greater than 0 wt % to 15 wt % of polypropylene.

6. The thermoplastic resin composition according to claim 5, wherein the non-crosslinked thermoplastic polyolefin composite resin has a Shore A hardness of 87 to 92, a melt flow index of 0.6 g/10 min to 0.8 g/10 min, 230° C./2.16 kg, a specific gravity of 0.88 to 0.90, and an elongation of 600% to 700%.

7. The thermoplastic resin composition according to claim 5, wherein the partially-crosslinked thermoplastic polyolefin composite resin has a Shore A hardness of 63 to 66, a melt flow index of 0.6 g/10 min to 1.2 g/10 min, 230° C./5 kg, and a specific gravity of 0.88 to 0.90.

8. The thermoplastic resin composition according to claim 5, wherein the completely-crosslinked thermoplastic polyolefin composite resin has a Shore A hardness of 64 to 69, a melt flow index of 20 g/10 min to 25 g/10 min, 230° C./10 kg, and a specific gravity of 0.88 to 0.90.

9. The thermoplastic resin composition according to claim 1, wherein each of the biomass-derived polyethylene and the additional biomass-derived resin is prepared from biofuels processed or extracted from one biomass material selected from the group consisting of corn, Jerusalem artichokes, sugar cane, sugar beets, and combinations thereof.

10. The thermoplastic resin composition according to claim 1, further comprising: one additive selected from the group consisting of plasticizers, inorganic fillers, photostabilizers, heat stabilizers, antioxidants, lubricants, flame retardants, antimicrobials, anti-hydrolysis agents, and combinations thereof.

11. An automotive interior molded article comprising: a sheet manufactured from the thermoplastic resin composition for automotive interior materials according to claim 1.

12. The automotive interior molded article according to claim 11, further comprising: a surface-treated layer.

13. The automotive interior molded article according to claim 12, wherein the surface-treated layer is formed using an electron beam curable water-based treatment agent or an electron beam curable solvent-free treatment agent.

14. A thermoplastic resin composition comprising:
a biomass-derived resin comprising biomass-derived polyethylene;
non-crosslinked thermoplastic polyolefin composite resin;
partially crosslinked thermoplastic polyolefin composite resin; and
completely crosslinked thermoplastic polyolefin composite resin wherein the completely-crosslinked thermoplastic polyolefin composite resin has a Shore A hardness of 64 to 69, a melt flow index of 20 g/10 min to 25 g/10 min, 230° C./10 kg, and a specific gravity of 0.88 to 0.90; and the thermoplastic resin composition has a percent modern carbon value of 15 wt % to 35 wt %, as measured in accordance with ASTM D6866,
wherein the thermoplastic resin composition comprises:
10 wt % to 50 wt % of the biomass-derived polyethylene, 0 wt % to 15 wt % of the additional biomass-derived resin,
0 wt % to 15 wt % of a compatibilizer,
3 wt % to 15 wt % of the non-crosslinked thermoplastic polyolefin composite resin,
30 wt % to 50 wt % of the partially crosslinked thermoplastic polyolefin composite resin,
2 wt % to 10 wt % of the completely crosslinked thermoplastic polyolefin composite resin,
0 wt % to 10 wt % of ethylene octene rubber, and
0 wt % to 15 wt % of polypropylene.

* * * * *